A. CALVERT.
REFLECTING DEVICE.
APPLICATION FILED OCT. 7, 1919.
1,349,558.
Patented Aug. 17, 1920.
2 SHEETS—SHEET 1.
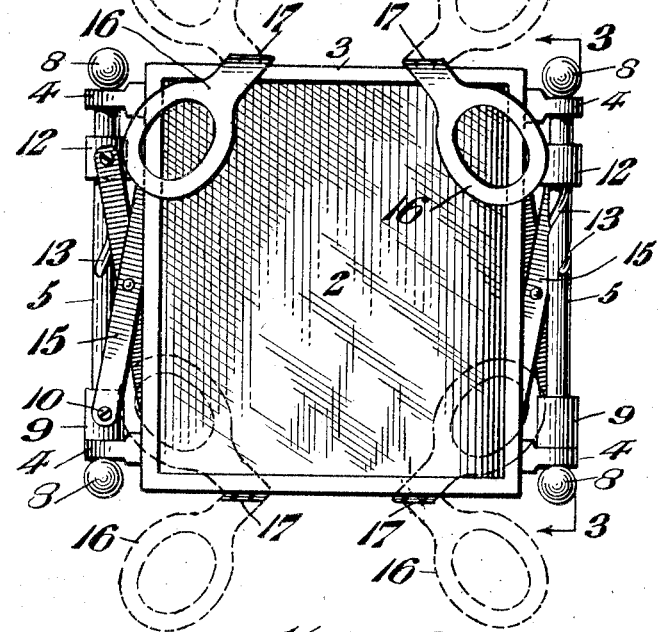
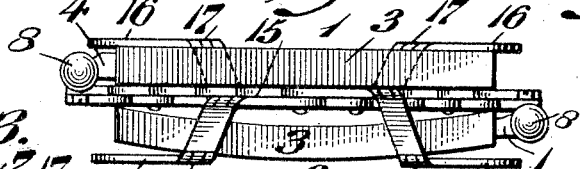
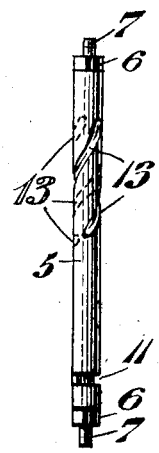
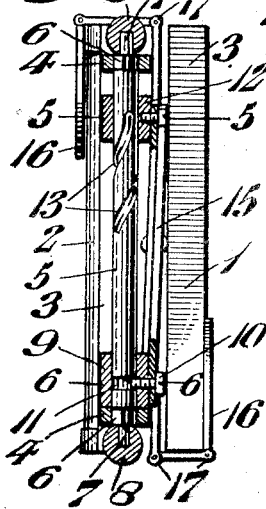
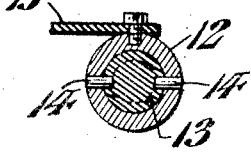
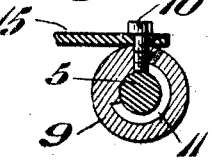
INVENTOR:
Alan Calvert.
BY Niederhein + Fairbanks
ATTORNEYS.

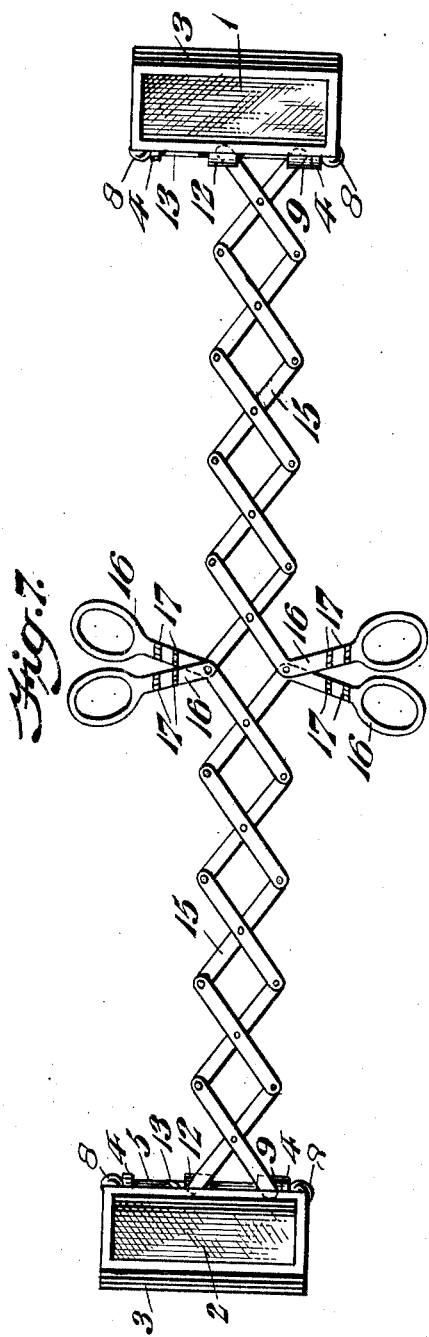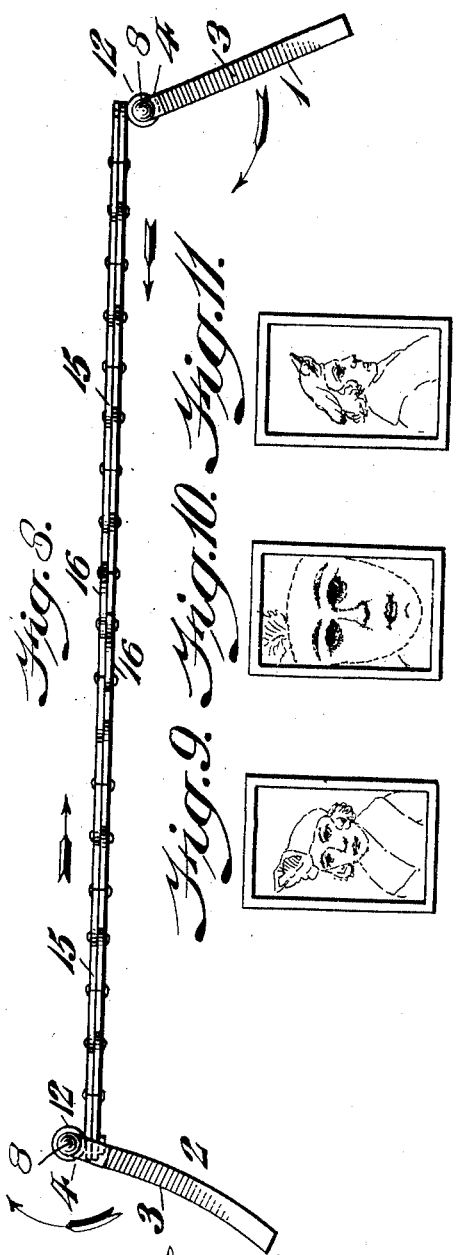

UNITED STATES PATENT OFFICE.

ALAN CALVERT, OF PHILADELPHIA, PENNSYLVANIA.

REFLECTING DEVICE.

1,349,558.  Specification of Letters Patent.  Patented Aug. 17, 1920.

Application filed October 7, 1919. Serial No. 329,108.

*To all whom it may concern:*

Be it known that I, ALAN CALVERT, a citizen of the United States, residing in the city and county of Philadelphia, State of Pennsylvania, have invented a new and useful Reflecting Device, of which the following is a specification.

My invention consists of a reflecting device consisting of a combination of mirrors which are adapted to be set at various angles so as to reflect the head and body of a viewer in different positions, and to reflect the head in full face, reduced face, and reduced profile, provision being made for conveniently adjusting the members relatively to each other as to distance, and in their angular relations, such adjustment being automatically accomplished. It consists also of details of construction.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a front elevation of a reflecting device in folded condition embodying my invention.

Fig. 2 represents a top view thereof.

Fig. 3 represents a vertical section on line 3—3 Fig. 1.

Fig. 4 represents a side elevation of one of the supporting posts of the mirror.

Fig. 5 represents a horizontal section on line 5—5 Fig. 3.

Fig. 6 represents a horizontal section on line 6—6 Fig. 3.

Fig. 7 represents a front elevation of the device in operative condition on a reduced scale.

Fig. 8 represents a top view thereof.

Figs. 9, 10 and 11 represent diagrammatic views of reflections that may be produced by the use of the duplex mirrors.

Similar numerals of reference indicate corresponding parts in the figures.

Referring to the drawings—

1 designates a mirror having a flat face, and 2 designates a mirror having a convex face. Each mirror on the upper and lower ends of its frame is provided with eyes 4 which are mounted on posts 5, the openings in said eyes being squared to receive the squared portions 6 of the relative ends 7 of the posts, the extreme terminals of the posts having thereon the tightly fitting nut-like members 8 which are adapted to retain said eyes 4 in position on the post.

On the lower portion of each post is the collar 9, which is retained in position by the screw 10 whose point enters the circumferential groove 11 in the post forming a swivel which retains said collar in position, but permitting the post to turn therein.

On the post above the collar 9 is the traveling collar 12 which is adapted to raise and lower on the post, it being noticed that the side of the latter has therein the spiral groove 13 which receives the pins 14 whose points are adapted freely to enter said groove whereby said collar in its raising and lowering motions is adapted to rotate the post in opposite directions, and consequently the mirrors relatively to each other.

15 designates a lazy tongs consisting of a series of bars or blades pivoted together, the terminals of which are pivotally connected with the collars 9 and 12, on the opposite posts respectively, it being evident that when the lazy tongs are operated the mirrors may be extended and so separated or spread apart supported by the lazy tongs, as shown in Figs. 7 and 8, or brought together in folded condition, as in Figs. 1 and 2.

In order to operate the lazy tongs in a convenient and easy manner the central bars thereof have connected with them the finger pieces 16 which act as handles for the purpose stated. The members of said pieces are connected by the hinges 17 whereby the former may be folded on the mirrors in compact form, as shown in Fig. 1.

In Fig. 1, the device is shown in folded condition; now in order to spread the mirrors and place them in operation, as in Figs. 7 and 8, the lazy tongs are extended whereby as the bars of the tongs are opened-out, the mirrors move from each other and are placed at angles projecting from the terminals of the lazy tongs, as shown most plainly in Fig. 8, and the angles of reflection of the mirrors may be varied according to requirements by opening or closing the bars of the lazy tongs to various positions. In thus positioning the mirrors the bars that are connected with the traveling collars 12 raise or lower and so impart the raising and lowering motions to said collars 12, whereby the pins 14 and the spiral grooves 13 into which the points of said pins project as has been stated, cause the rotation of the posts whereby the mirrors turn with the latter and so are caused to assume their angular positions relatively to the lazy tongs.

When the lazy tongs is operated to close its bars, the collars 12 are moved in a direction the reverse to that in opening the lazy tongs and so the posts are rotated in a reverse direction in the first instance, and so as the mirrors are brought together they are turned as to fold on the lazy tongs and so placed flat on the latter in the compact form, the mirrors being placed on opposite sides of the lazy tongs, as shown most plainly in Figs. 2 and 3.

It will be seen that the flat mirror is adapted to reflect a full front face of the viewer, as in Fig. 10, and the convex mirror is adapted to reflect a reduced full front face of the viewer, as in Fig. 9. Again by manipulating both mirrors, it is possible to so incline them so as to get on the flat mirror an image from the convex mirror which latter then will give a reduced image in profile, as in Fig. 11.

By holding the pair of mirrors in different positions it is equally possible to get a reduced image of the back of the head, or back of the neck, thus enabling a woman to see the arrangement of the coiffure or head gear, and consequently the back and arrangement of a dress, or the fit of a garment across the shoulders, and other uses of the mirrors will suggest themselves.

While the mirror as presented is portable and may be carried in a folded condition in a pocket, bag, etc., the members may be supported on a stand to be placed on a floor of a boudoir, store, etc., or on a table, bureau, etc., or connected with arms which may be clamped to the back of a chair or other article of furniture.

Having thus described my invention what I claim as new and desire to secure by Letters Patent, is:

1. A reflecting device consisting of a combination of mirrors, and a supporting and connecting member therefor adapting the mirrors to be longitudinally adjusted as to distance to and from each other by said member, and means on the support and mirrors adapting the latter to be automatically angularly adjusted relatively to each other by the motions of said member.

2. A reflecting device consisting of a combination of mirrors, a longitudinally extensible and retractable supporting member for said mirrors intermediate thereof adapted to adjust the distance between said mirrors, and means connected with said member and mirrors whereby by the motions of said member the mirrors adjust automatically their angularity.

3. A reflecting device consisting of a combination of mirrors, a longitudinally extensible and retractable supporting member for said mirrors intermediate thereof adapted to adjust the distance between said mirrors, and means connected with said member and mirrors whereby by the motions of said member the mirrors are adapted to adjust automatically their angularity and said mirrors are adapted to be folded automatically on said member.

4. A reflecting device formed of a combination of mirrors, an extensible and contractable support, rotatable posts intermediate of said supports and mirrors, and means on said mirrors adapted to mount the latter on said posts, said means consisting of slidable pins with which said support is connected, and spirally extending grooves in said posts in which said pins are movable whereby by the operation of said posts and pins the mirrors are adapted to have their angularity automatically adjusted.

5. A reflecting device consisting of a combination of mirrors, extensible and retractable means connecting the same and forming the support therefor, means actuated by the lengthwise movement of said support for simultaneous adjustment of said mirrors as to distance apart and angularity, and means on said support between the mirrors for manually operating said support to extend and retract the same.

6. A reflecting device consisting of a combination of mirrors of different reflecting natures, and an extensible and retractable supporting member therefor, said mirrors being adapted to be longitudinally adjusted to and from each other by said member and adapted to be automatically angularly adjusted on said member relatively to each other by the motions of said member.

ALAN CALVERT.

Witnesses:
JOHN A. WIEDERSHEIM,
N. BUSSINGER.